Figure 1:
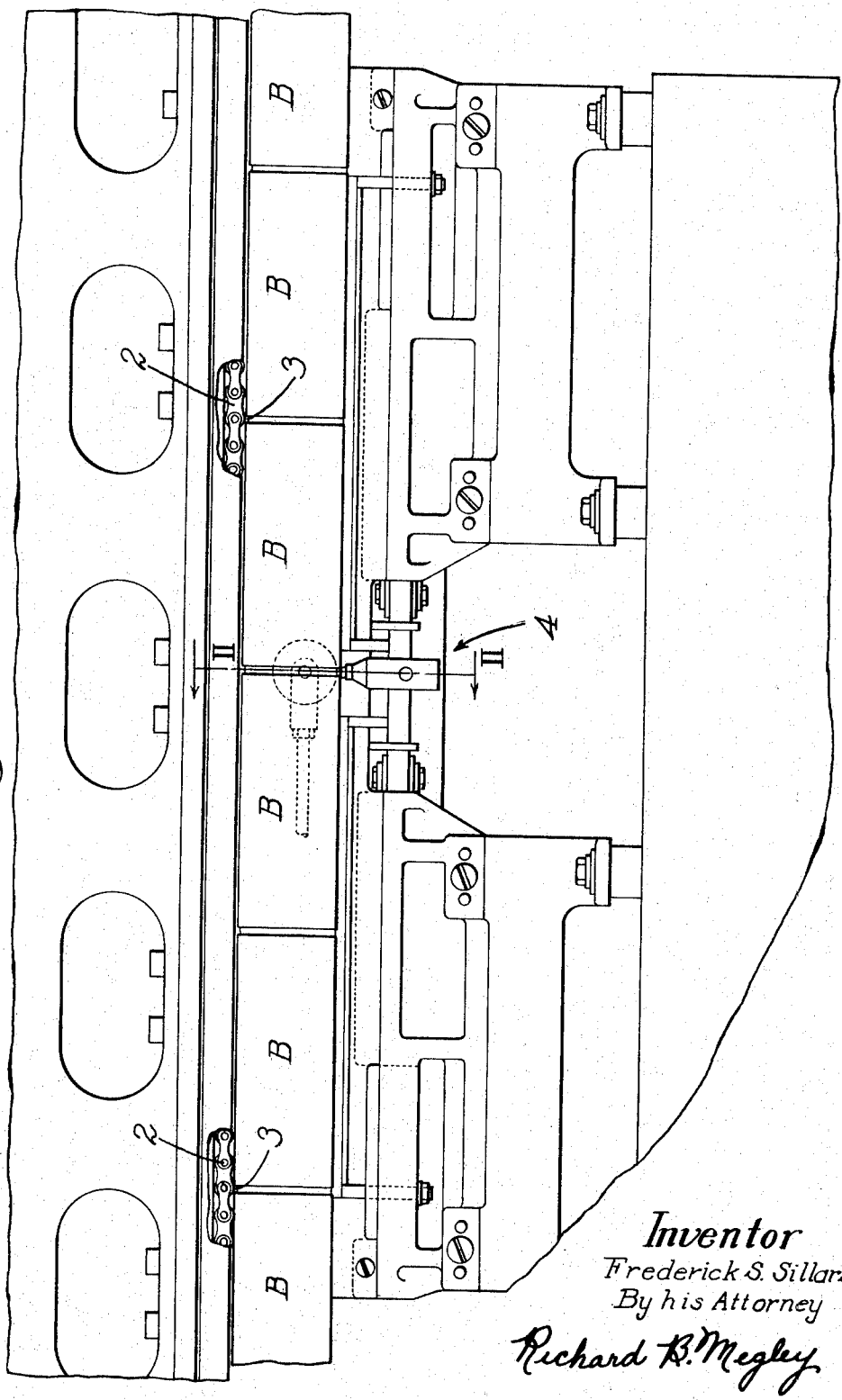

March 5, 1968

F. S. SILLARS 3,371,837

SOLDER APPLICATORS

Filed Dec. 13, 1965

2 Sheets-Sheet 1

Inventor
Frederick S. Sillars
By his Attorney
Richard B. Megley

March 5, 1968  F. S. SILLARS  3,371,837
SOLDER APPLICATORS
Filed Dec. 13, 1965  2 Sheets-Sheet 2
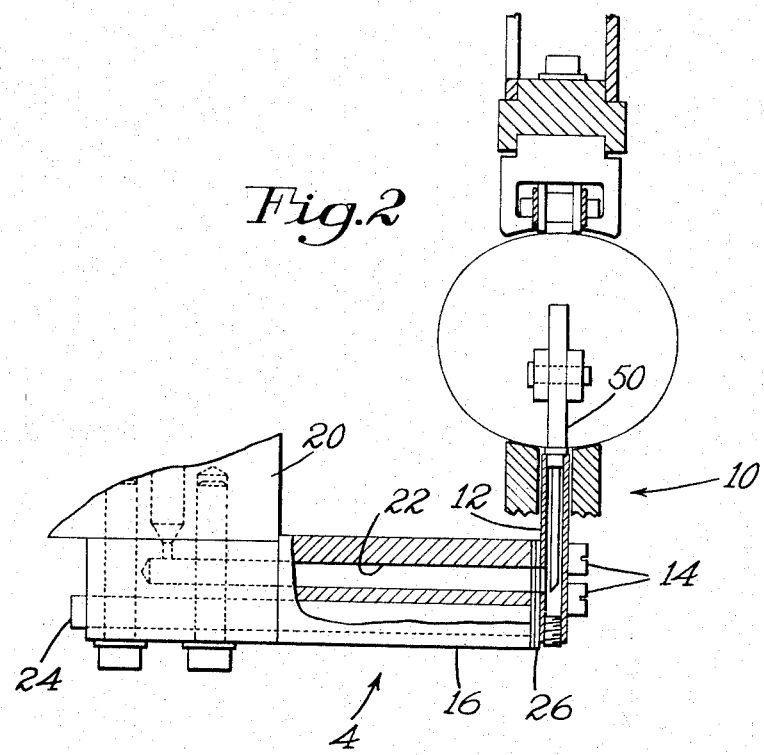
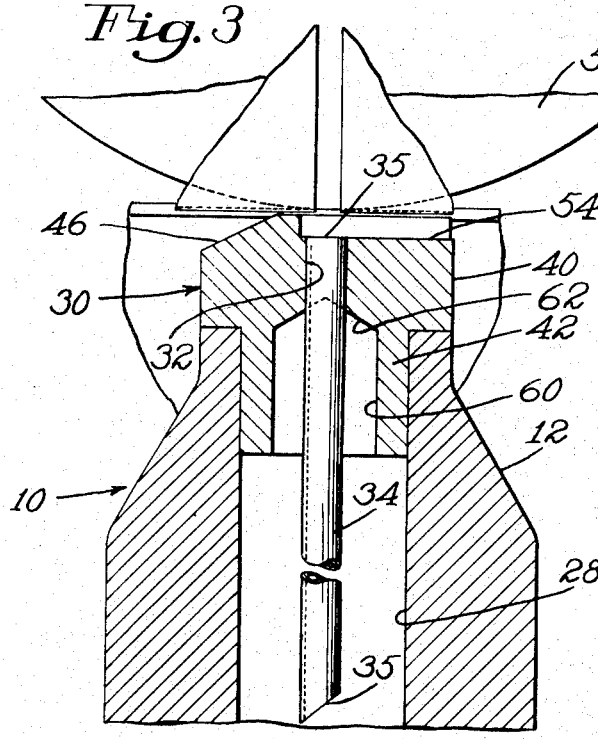
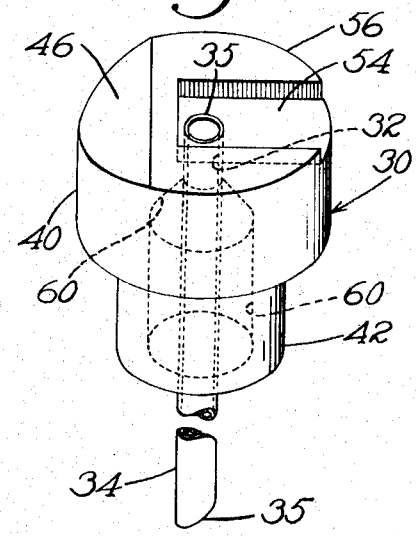

United States Patent Office 3,371,837
Patented Mar. 5, 1968

3,371,837
SOLDER APPLICATORS
Frederick S. Sillars, Beverly, Mass., assignor to United Shoe Machinery Corporation, Boston, Mass., a corporation of New Jersey
Filed Dec. 13, 1965, Ser. No. 513,258
7 Claims. (Cl. 228—43)

This invention relates to apparatus for soldering can bodies and, more particularly, to an improved applicator for applying solder to the side seams of "tin" cans. The conventional method of forming a "tin" can is to bend a sheet of metal into a tube and interlock its edges to form a side seam or longitudinal seam joint of interlocked layers. It is to these layers that solder must be applied to seal the side seam. Apparatus including an applicator for applying solder to a can formed in the manner just described is disclosed in applicant's United States Patent No. 3,190,528, issued June 22, 1965. The present invention relates to an improved applicator for use in combination with the apparatus described in the referenced patent.

Solder applicators of the type disclosed in the referenced patent generally comprise a rigid body having a passageway through which solder is fed from a solder pot to a discharge orifice. Solder is projected from the applicator at the discharge orifice into the side seam of a can body passing thereabove. The solder pot normally has adjusting means associated therewith for controlling the height of molten solder in the pot. Means are also generally provided for continuously feeding bars of solder into the pot.

In the operation of soldering machines of this type, slag or solder oxides are formed in the solder pot during the melting of the bars of solder. The slag or oxides of solder are passed through the passageways in the applicator and rise to the upper portion of the applicator passageway where the discharge passageway is located. This is due to the lower specific gravity of the slag or oxides with respect to solder. As a result, clogging frequently occurs in the discharge passageway due to the build up of slag around the ingress opening to this passageway. Additionally, a certain amount of foreign material is unavoidably introduced into the solder pot and, consequently to the discharge passageway during extended usage of these machines. Accordingly, a common problem encountered in the use of side seam soldering machines of this type is the blockage or restriction of the ingree opening to the discharge passageway through which the solder is fed by slag and other foreign material.

Accordingly, it is an object of this invention to provide a solder applicator having means for avoiding the formation of obstructions in ingress opening of the discharge passageway during use of the applicator.

The problem of blockage or clogging of the discharge passageway also is present at the egress opening or discharge orifice. This is particularly true for an applicator having a substantially vertical or high trajectory discharge passageway. Solder flowing from a vertical discharge passageway is projected directly upward into the side seam of a can body thereabove. Passage of solder through the gaps between succeeding can bodies is avoided by placing a shield member such as a roll at the location where the gaps between succeeding moving can bodies intersects the solder trajectory. The shield member must be located, in the case of a roll, so that the leading and trailing ends of succeeding can bodies are engaged by the circumference of the roll thereby to prevent passage of solder into the can bodies. An arcuate portion of the roll, consequently, depends coincident with or slightly below the path of movement of the side seams of the can bodies. When an applicator is positioned in close proximity to the path of movement of the can bodies, the arcuate depending portion of the roll "tamps" or forces solder back into the discharge passageway thereby resulting in clogging of the egress opening or discharge orifice. The applicator is normally located in close proximity to the path of seam movement to ensure proper solder disposition.

It is a further object of this invention to provide a solder applicator having means for avoiding clogging of the egress opening or discharge orifice of the passageway caused by a shield member employed to prevent solder from entering can bodies exposed to the applicator.

To these ends and in accordance with a feature of this invention there is provided in a machine for applying solder to the side seams of moving can bodies, an applicator comprising a base member, an orifice member removably mounted in the base member, and a flow tube mounted in the discharge passageway of the orifice member. The flow tube depends into the solder passageway in the base member. The orifice member has a recessed discharge surface.

The above and other features of the invention including various novel details of construction and combinations of parts will now be more particularly described with reference to the accompanying drawings and pointed out in the claims. It will be understood that the particular embodiment of the invention is shown by way of illustration and not as a limitation of the invention. The principles and features of this invention may be employed in varied and numerous embodiments without departing from the scope of the invention.

In the drawings,
FIG. 1 is a side elevation of a can body soldering machine embodying the invention;
FIG. 2 is a sectional view, on an enlarged scale, taken along the line II—II of FIG. 1;
FIG. 3 is a side elevation, on an enlarged scale, partly in section, of the applicator illustrated generally in FIG. 2; and
FIG. 4 is a perspective view, on an enlarged scale, of the applicator illustrated generally in FIG. 2.

FIG. 1 shows can bodies B which were formed in a body-maker of any conventional type, not shown, being conveyed from left to right in a timed and spaced order by a machine having an endless chain 2 and feed dogs 3 located at predetermined spaced intervals. Each dog is engageable with the trailing end of one can body, the spaces between adjacent bodies being equal to the length of the dogs. The can bodies B are conveyed past a soldering station 4 which forms the subject matter of this invention. The construction and location of parts is substantially as illustrated and described in my above referenced patent.

The soldering station 4 includes a two part applicator 10 having a base portion 12 which is secured by screws 14 to an arm 16 (FIG. 2) extending from the bottom of a solder reservoir 20 in a manner identical to that discussed in the above referenced patent. The reservoir 20 includes adjusting means, not shown, for controlling the height of molten solder and means for continuously feeding bars of solder to the reservoir through the arm 16 in a horizontal passageway 22 which is maintained at a constant, predetermined temperature by a resistance heater 24. As in the referenced patent, horizontal adjustment of the applicator 10 is obtained by the use of shims 26 between the applicator 10 and the mounting arm 16 therefor.

In the preferred embodiment particularly illustrated in FIGS. 3 and 4, the solder applicator 10 comprises the rigid base member 12 which has an internal solder passageway 28, an orifice member 30 mounted on said base member having a substantially vertical or high trajectory, discharge passageway 32, and a flow tube 34 force fit into the discharge passageway 32 and depending downwardly from the orifice member into the central portion of the passageway 28. The passageway 28 in the base member 12 communicates with the passageway 22 in the arm 16. External guide means (not shown) such as described in my application for United States Patent Ser. No. 323,387, filed Nov. 13, 1963, now Patent No. 3,255,856, are normally required when an applicator of the type to be described is employed.

The orifice member 30 comprises an upper orifice portion 40 and a depending mounting portion 42 complementary in size and configuration to the upper end of the passageway 28. The orifice member 30 is mounted on the base 12 by insertion of the mounting portion 42 into the upper end of the passageway 28. The orifice portion 40 has a camming surface 46 on its left hand or forward end in relation to the direction of can body flow. Any can body being conveyed along the machine as illustrated in FIG. 1, which is displaced below the normal path of movement will be engaged by the camming surface 46. The camming surface thus acts to ensure substantial heightwise alinement at the soldering station. Further, the camming surface prevents a can jam which would otherwise result if a displaced can body engaged an obstruction.

When a vertical or high trajectory discharge passageway is used, a shield must be employed in the gaps between can bodies to prevent solder from squirting through the gaps and being deposited within a can body. In the preferred embodiment illustrated, a roll 50 is employed as a shield. The roll 50 may be mounted for vertical yielding movement within the line of can bodies at a point above the applicator 10 by any convenient means. The roll 50 is preferably urged into continuous, yielding contact with the can body or bodies located at the soldering station by the force of gravity or spring means, as illustrated in FIG. 1.

The orifice portion 40 has a recessed portion 54 in the general form of a milled slot in the upper discharge surface 56 the width of which is less than the width of the roll 50. The discharge passageway 32 as well as the tube 34 intersect the upper surface 56 in the recessed portion 54 creating an orifice or egress opening 35 whereby to avoid engagement of the roll 50 therewith and to eliminate "tamping" of solder back into the discharge passageway by the roll. That is, if an arcuate portion of the roll 50 depends coincident with or below the can line, it will engage that portion of the surface 56 which extends laterally of and above the recessed portion 54. The roll 50 will, thus, always be displaced from the egress opening 35 of the discharge passageway. Further, the recessed location of the egress opening 35 of the discharge passageway diminishes any tamping forces transferred from the roll through a stream of solder between the discharge passageway 32 and the roll 50.

The depending mounting portion 42 of the orifice member 40 has a passageway 60 of circular cross-section. The passageway 60 terminates generally at the juncture between the orifice portion 40 and mounting portion 42. The passageway 60 communicates with a frusto-conical passageway 62 in the orifice member 40. The generally conical passageway 62 is truncated by intersection with the discharge passageway 32 in the orifice member 40.

The flow tube 34 is force fit into the discharge passageway 32 and depends downwardly therefrom through the passageways 62 and 60 into the central portion of the passageway 28. The upper end of the flow tube 34 is generally flush with the surface 54 whereby to avoid the tamping discussed above. Thus, solder applied to a side seam is drawn from the central portion of the passageway 28 thereby markedly decreasing the amount of impurities such as slag or solder oxides which are applied to the side seams of can bodies exposed to the applicator 10. Since, as discussed above, slag and solder oxides rise to the upper portion of the applicator due to their lower specific gravity, such impurities will not normally be drawn into the flow tube 34. Only those impurities which happen to flow into the tube 34 in their rise within the passageway 28 will be applied to a side seam. The amount of such impurities is relatively small.

In the preferred embodiment, the lowermost end of the tube 34 extends at least to the bottom of the passageway 22 and is cut on an angle as at 35 to decrease even further the quantity of impurities which enter the tube. The angularly cut portion 35 of tube 34 is oriented in alinement with but faces away from the pasageway 22 and thereby acts as a buttress to impurities flowing therefrom whereby to direct such impurities away from the tube opening.

The slag and solder oxides entering the passageway 28 rise to the upper portion thereof, pass through the passageway 60, and are trapped in the frusto-conical passageway 62. It is to be emphasized that the passageway 62 communicates with the orifice 32 and, consequently, except for the flow tube 34, the slag and solder oxides trapped therein would form an obstruction to solder flow. The use of the flow tube 34, for all practical purposes, avoids this orifice clogging problem which has diminished the utility of every prior applicator of this type used for side seam soldering.

In the use of an applicator 10 of the type discussed above, solder is introduced into the solder pot in conventional manner. The solder flows through the passageway 30 and into the passageway 28. Impurities such as slag and solder oxides in the solder rise in the passageway 28 into the passageway 60 and are collected in the passageway 62. Essentially pure solder is drawn into the flow tube 34 at the central portion of the passageway 28 and is applied to the side seam of a can body located above the applicator. The passageway 62 conveniently may be cleaned by removing the orifice member 30, removing the flow tube 34, therefrom, and scrapping the exposed passageway 62.

Having thus described my invention, what I claim as new and desire to secure by Letters Patent of the United States is:

1. In a machine for applying solder to the side seams of moving can bodies, an applicator comprising a base member having a first solder passageway and an orifice member removably mounted on said base member having a discharge passageway of smaller diameter than said first passageway and terminating at an interior portion of the first passageway below the uppermost confine of said first passageway whereby solder discharged from the applicator is drawn from a level which is below the uppermost level of the said first solder passageway.

2. In a machine for applying solder to the side seams of moving can bodies, an applicator comprising a base member having a first solder passageway, an orifice member removably mounted on said base member having a discharge passageway of smaller diameter than said first passageway, and a flow tube mounted in said discharge passageway.

3. In a machine for applying solder to the side seams of moving can bodies, an applicator comprising a base member having a first solder passageway and an orifice member removably mounted on said base member comprising an orifice portion having a recessed discharged surface and a discharge passageway of smaller diameter than said first passageway which terminates at the recessed surface, and a depending mounting portion having a second solder passageway which communicates with the first passageway and the discharge passageway and terminating at an interior portion of the first passageway below the uppermost confine of said first passageway whereby solder discharged from the applicator is drawn from a level which is below the uppermost level of the said first solder passageway.

4. In a machine for applying solder to the side seams of moving can bodies, an applicator comprising a base member having a first solder passageway, an orifice member removably mounted on said base member comprising an orifice portion having a recessed discharged surface and a discharge passageway of smaller diameter than said first passageway which terminates at the recessed surface, and a depending mounting portion having a second solder passageway which communicates with the first passageway and the discharge passageway, and a flow tube mounted in said discharge passageway.

5. In a machine for applying solder to the side seams of moving can bodies, an applicator comprising a base member having a first solder passageway, an orifice member comprising an orifice portion having a recessed discharge surface and a discharge passageway which terminates at the recessed surface and a depending portion mounted within said first solder passageway having a second solder passageway which communicates with the first passageway and the discharge passageway, and a flow tube force fit into said discharge passageway having an end generally flush with the recessed surface and an opposite end portion terminating at an interior portion of the first passageway below the uppermost confine of said first passageway whereby solder discharged from the applicator is drawn from a level which is below the uppermost level of the said first solder passageway.

6. In a machine for applying solder to the side seams of moving can bodies, the combination of means for moving the bodies along a predetermined path of travel in spaced relation with gaps between adjacent bodies, means for shielding the gaps between the spaced can bodies to prevent the passage of solder therethrough, and an applicator having a recessed discharge surface and a shield engaging portion, a solder discharge orifice located in the recessed surface spaced from the shield engaging portion to avoid contact with the shield, and means for discharging solder from said discharge orifice.

7. In a machine for applying solder to the side seams of moving can bodies, the combination of means for moving the bodies along a predetermined path of travel in spaced relation with gaps between adjacent bodies, a roll for shielding the gaps between can bodies to prevent the passage of solder therethrough, and an applicator comprising a base member having a solder passageway and an orifice member having a portion engageable with said roll, a recessed discharge surface recessed with respect to said engageable portion and a discharge passageway terminating at the discharge surface thereby to form a discharge orifice spaced from the roll to avoid contact of the roll with the discharge orifice.

No references cited.

RICHARD H. EANES, JR., *Primary Examiner.*